United States Patent
Hoof van

(10) Patent No.: US 9,432,559 B2
(45) Date of Patent: Aug. 30, 2016

(54) FRONT COVER FOR A HOUSING ENCLOSING A CAMERA

(75) Inventor: Berry Hoof van, Helmond (NL)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/354,704

(22) PCT Filed: Oct. 27, 2011

(86) PCT No.: PCT/EP2011/068847
§ 371 (c)(1),
(2), (4) Date: Apr. 28, 2014

(87) PCT Pub. No.: WO2013/060370
PCT Pub. Date: May 2, 2013

(65) Prior Publication Data
US 2014/0240589 A1  Aug. 28, 2014

(51) Int. Cl.
*H04N 5/225* (2006.01)
*G03B 11/00* (2006.01)
*G03B 17/08* (2006.01)
*G08B 13/196* (2006.01)

(52) U.S. Cl.
CPC ............ *H04N 5/2252* (2013.01); *G03B 11/00* (2013.01); *G03B 17/08* (2013.01); *G08B 13/19619* (2013.01); *G08B 13/19626* (2013.01)

(58) Field of Classification Search
CPC .. H04N 5/2252; G03B 11/048; G03B 17/08; G08B 13/19619; F16F 7/12–7/122; F16F 7/124; F21V 15/04; B60Q 1/0491
See application file for complete search history.

(56) References Cited

U.S. PATENT DOCUMENTS

| | | | |
|---|---|---|---|
| 5,895,115 A * | 4/1999 | Parker | B60Q 1/0082 362/244 |
| 6,476,856 B1 * | 11/2002 | Zantos | 348/151 |
| 6,505,005 B1 | 1/2003 | Takahashi et al. | |
| 2006/0017842 A1 | 1/2006 | Jun | |
| 2006/0177217 A1 | 8/2006 | Opmeer | |
| 2010/0128165 A1 | 5/2010 | Newcomb et al. | |

FOREIGN PATENT DOCUMENTS

| | | |
|---|---|---|
| EP | 1729269 | 12/2006 |
| FR | 2813428 | 3/2002 |

OTHER PUBLICATIONS

International Search Report for Application No. PCT/EP2011/068847 dated Jul. 18, 2012 (2 pages).

* cited by examiner

*Primary Examiner* — Paul Berardesca
(74) *Attorney, Agent, or Firm* — Michael Best & Friedrich LLP

(57) ABSTRACT

The invention provides for a front cover (10) adapted for a housing enclosing a camera. The front cover (10) comprises an aperture (12) covered by a window (14) made of a flexible material, the window (14) being fixed to the front cover (10) by a flexible adhesive (16).

20 Claims, 2 Drawing Sheets

FRONT COVER FOR A HOUSING ENCLOSING A CAMERA

BACKGROUND OF THE INVENTION

The invention provides for a front cover adapted for a housing of a camera, especially a ball-shaped housing, comprising an impact resistant flexible window and such an impact resistant flexible window. Furthermore, the invention provides for a camera having a housing comprising such a front cover.

The housing of a camera requires a window within the front cover to define the line of sight of the camera. In one realization the camera cannot be moved with respect to the housing. In another realization the camera can be moved with respect to the housing, this realization is called a dome camera. A dome camera usually has a housing made of a transparent material.

A dome camera is a monitoring camera used in a protective system. Usually, the dome camera is incorporated within a hemispherical shaded dome made of plastics. Said dome is provided for protecting the camera against damage and vandalism. The dome comprises a front cover having an aperture which is covered by a window.

Dome cameras have been used at flashpoints as well as in public means of transport both interior and exterior. A main advantage of such a dome camera is that it is not possible to determine the orientation of the camera hidden by the shaded dome.

Document EP 1 729 269 A1 discloses a dome with optical correction for use in a vandal proof surveillance camera system. The dome comprises a transparent optical material, which itself comprises an inner surface and an outer surface. Both surfaces are essentially rotational symmetrical and exhibit non-spherical shapes. Said dome is used in a vandal proof surveillance camera system comprising said dome and a camera being pivotably mounted inside the dome.

In case the camera is fixed with respect to the housing only a section of the housing has to be transparent, namely the so-called window defining the line of sight. The front part of the housing comprising the window is called the front cover which can be built integrally with the housing or separately as a separate component, which has to be connected with the housing.

It is a problem to use a window in the front cover that can handle the stress and material deflection during impact. Furthermore, the window should be able to return to its original shape after the impact.

SUMMARY OF THE INVENTION

The invention provides for a front cover, a window for a front cover, and a housing for a camera.

The housing protects the camera against exterior effects, especially impacts resulting from vandalism. The weak point of the housing is the window as it has to be made of a transparent material. Furthermore, a damaged window prevents the camera to be used as intended.

To ensure fail-safe operation of the camera the window within the housing, which is put in the aperture of the front cover of the housing, is made of a flexible material to be able to take up forces caused by impact, for example.

In one embodiment, the design shown is made to be flexible enough for impact and at the same time rigid enough to "flex" back in its original shape to hold the sphere water tight and keep an acceptable margin of optical performance for the optics inside the dome to produce an acceptable picture.

The impact resistant flex window can be built of one material but is "seated" in the front cover by a flexible adhesive which allows the window to flex. The size of the window can be different. In one embodiment, the window as the aperture overlap less than half of the front cover. In another embodiment, the window and the aperture overlap more than half of the front cover. The size of the aperture and the window and even the shape can be adjusted to the camera used.

Material for the window can be an amorphous thermoplastic material, e.g. Lexan® 923A, material for the adhesive can be a neutral cure silicone adhesive, e.g. Dow Corning® 7091 (silicone elastomer). The window can be fixed solely by the adhesive.

The foregoing summary as well as the following detailed description of preferred embodiments of the invention will be better understood when read in conjunction with the appended drawings. For the purpose of illustrating the invention, embodiments of the invention are shown in the drawings. It should be understood however, that the invention is not limited to precise arrangements and instrumentalities shown.

It is self-evident that the features mentioned above and those which are still to be explained in the following text can be used not only in the respectively stated combination but also in other combinations or on their own without departing from the scope of the present invention.

BRIEF DESCRIPTION OF THE DRAWINGS

The invention will be described in more details with reference to the drawings given below, in which.

DETAILED DESCRIPTION

Figure 1:
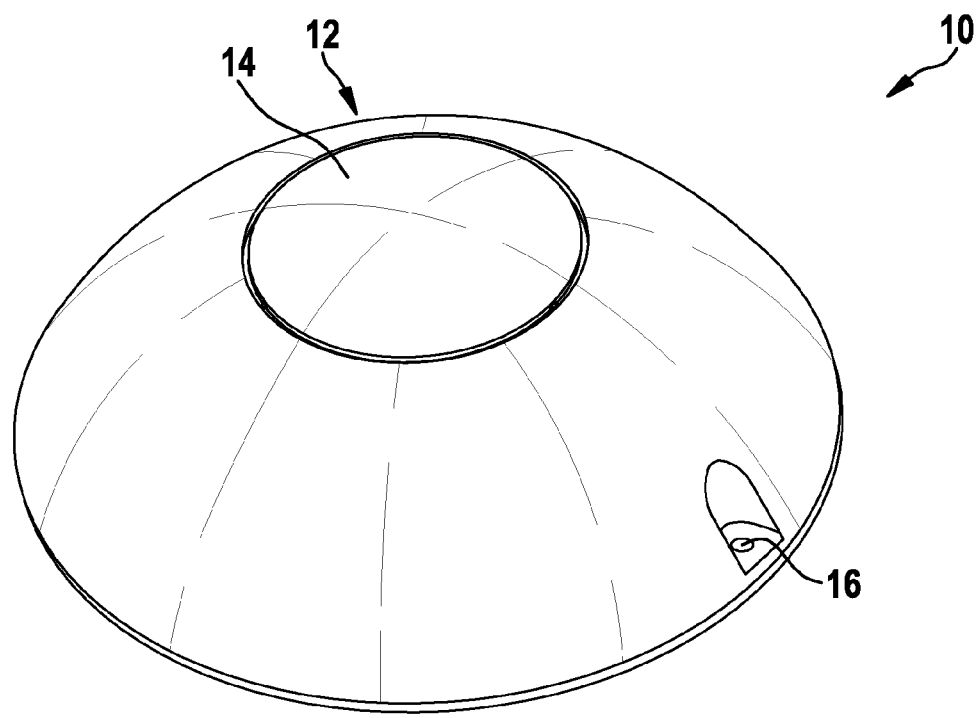
FIG. 1 shows a front cover of a housing used for a camera comprising a window according to an embodiment of the invention in a top view.

FIG. 1 shows a front cover of a dome denoted overall with reference number 10. The front cover 10 shown is hemispherically formed and comprises a central aperture 12, which is covered by an optical window 14 shown in assembled condition. Furthermore, the front cover 10 comprises a bore 18 for mounting the front cover 10 to a housing (not shown). This hemispherically formed front cover is adapted to a ball-shaped housing near-completely or completely enclosing a camera. The housing can be ball-shaped.

The window 12 overlaps less than half of the front cover 10. In further embodiments, the window 14 overlaps half of or more than half of the front cover 10.

Figure 2:
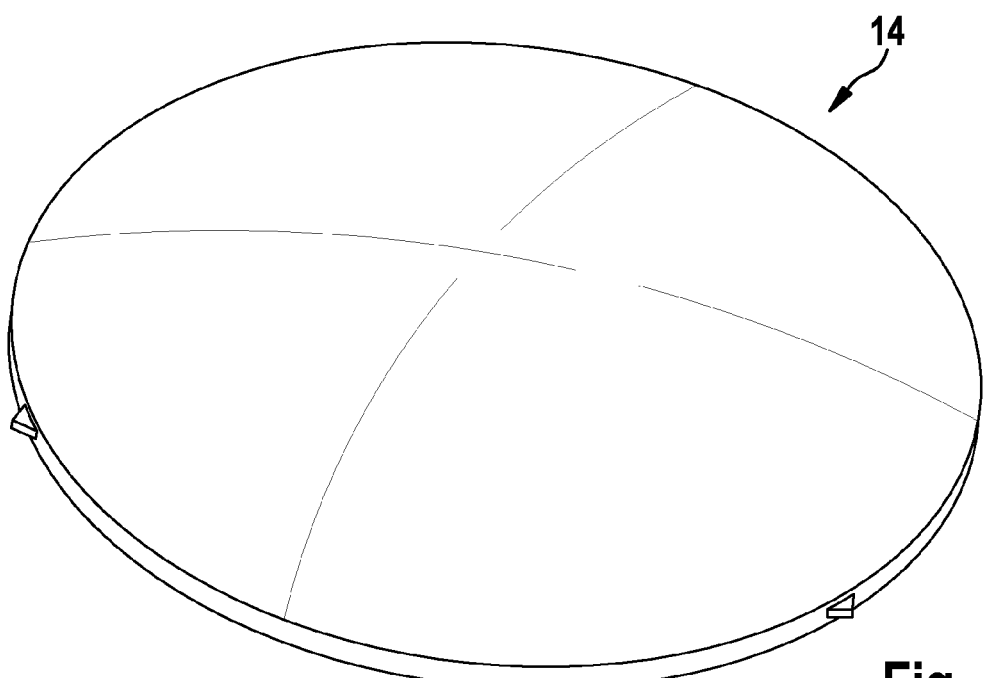
FIG. 2 shows the window of FIG. 1.

FIG. 2 shows the window 14 of FIG. 1 in unassembled condition. Thus, the drawing shows the original shape of the window 14, which is concave and circular. The window 14 is made of a flexible material to be able to adopt the arcuate shape shown in FIG. 1. In another possible embodiment the window 14 is flat. Different shapes are possible, particularly dependent on the shape of the aperture. The window 14 is transparent.

Figure 3:
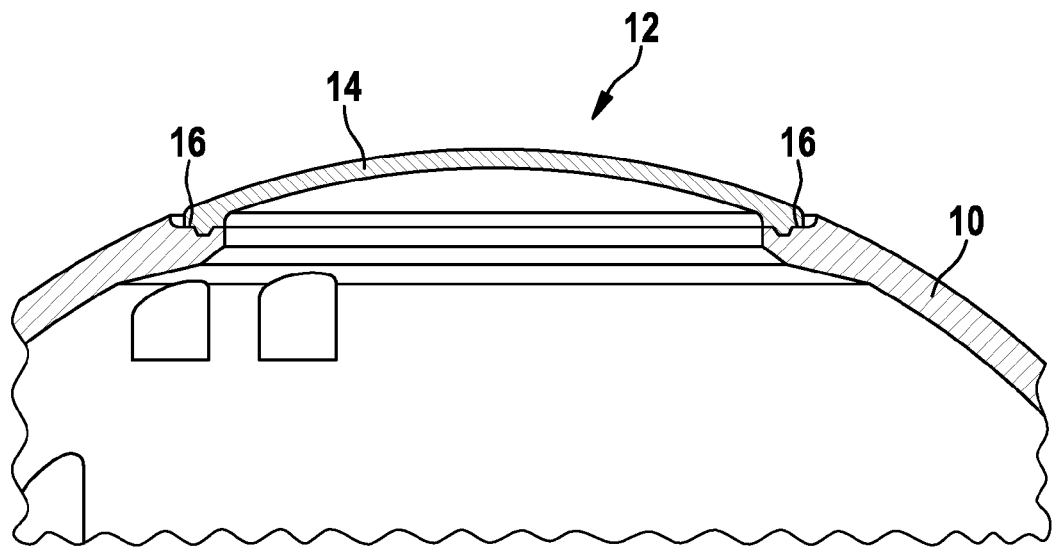
FIG. 3 shows a section view of the front cover of FIG. 1.

FIG. 3 shows the front cover 10 of FIG. 1 in a section view. The drawing illustrates the front cover 10 having an aperture 12 covered by the optical window 14. The window 14 is fixed within the aperture by the flexible adhesive 16 which is at least sectionally put on the window peripherally. The flexible window 14 is glued in the front cover 12 with the flexible adhesive 16. The adhesive 16 is at least sectionally put on the window 14. In another embodiment, the adhesive is completely put on the circumference of the window 14.

Figure 4:
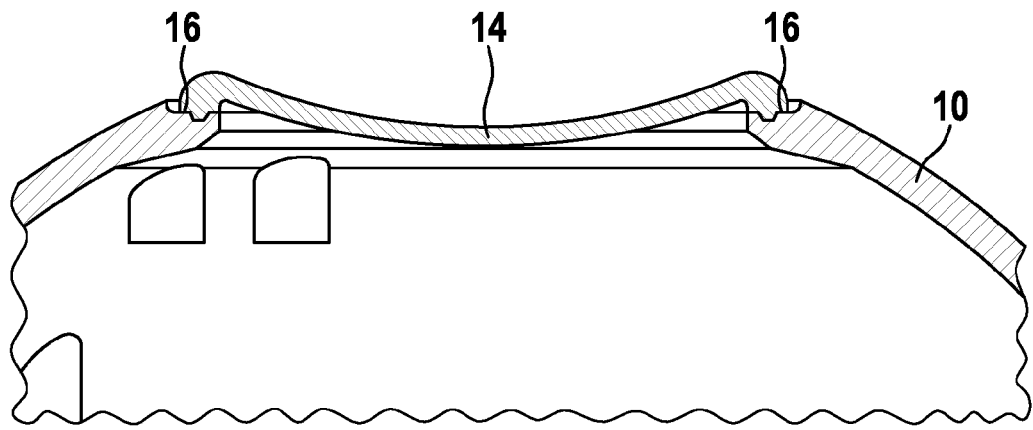
FIG. 4 shows the section view as in FIG. 3 illustrating the window during impact.

As shown in FIG. 4, during impact the window 14 can deform to the inside. It is to be noted that the impact resistant flexible window 14 in the embodiment shown is built of one material and is seated in the front cover 10 by the flexible adhesive 16, which allows the window 14 to flex. The flexible adhesive 16 allows the window 14 to flex out of its diameter.

After impact causing the window 14 to flex, the window 14 will return to its original shape as shown in FIG. 3.

What is claimed is:

1. A front cover assembly adapted for a housing enclosing a camera, the front cover assembly comprising a front cover (10) having an aperture (12) covered by a deformable window (14) made of a flexible material, the window (14) being fixed to the front cover (10) by a flexible adhesive, wherein the deformable window has a circular base and forms a spherical cap.

2. The front cover assembly according to claim 1, wherein the adhesive (16) is at least sectionally put on the window (14) peripherally.

3. The front cover assembly according to claim 1, wherein the front cover (10) is hemispherically formed.

4. The front cover assembly according to claim 1, wherein the aperture (12) of the front cover (10) overlaps less than half of the front cover (10).

5. The front cover assembly according to claim 1, wherein the aperture (12) of the front cover (10) overlaps more than half of the front cover (10).

6. A window for a front cover (10) according to claim 1, which is made of a flexible material.

7. A housing for a camera comprising a front cover assembly according to claim 1.

8. The housing according to claim 7, wherein the housing (10) is ball-shaped.

9. A camera enclosed by a housing according to claim 7.

10. The camera according to claim 9, wherein the camera is fixed with respect to at least one of the housing and the window (14).

11. The housing according to claim 7, wherein the adhesive (16) is at least sectionally put on the window (14) peripherally.

12. The housing according to claim 7, wherein the front cover (10) is hemispherically formed.

13. The housing according to claim 7, wherein the aperture (12) of the front cover (10) overlaps less than half of the front cover (10).

14. The housing according to claim 7, wherein the aperture (12) of the front cover (10) overlaps more than half of the front cover (10).

15. A front cover assembly adapted for a housing enclosing a camera, the front cover assembly comprising a front cover (10) having an aperture (12) covered by a window (14) made of a flexible material and with a circular perimeter and a concave shape, the window (14) being fixed to the front cover (10) and configured to deform in response to impact and thereafter return to its original shape.

16. The front cover assembly according to claim 15, wherein the window is in the form of a spherical cap.

17. The front cover assembly according to claim 1, wherein the window is fixed to the front cover solely by the flexible adhesive.

18. The front cover assembly according to claim 15, wherein the window is fixed to the front cover solely by a flexible adhesive.

19. The front cover assembly according to claim 1, wherein the circular base defines a diameter, and wherein the window is configured to flex out of its diameter in response to impact and thereafter return to its original shape.

20. The front cover assembly according to claim 15, wherein the circular perimeter defines a diameter, and wherein the window is configured to flex out of its diameter in response to impact.

* * * * *